(12) United States Patent
Natarajan et al.

(10) Patent No.: US 10,817,395 B2
(45) Date of Patent: Oct. 27, 2020

(54) PROCESSOR WITH NON-INTRUSIVE SELF-TESTING

(71) Applicant: TEXAS INSTRUMENTS INCORPORATED, Dallas, TX (US)

(72) Inventors: Venkatesh Natarajan, Bengaluru (IN); Karthikeyan Rajamanickam, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 99 days.

(21) Appl. No.: 15/841,442

(22) Filed: Dec. 14, 2017

(65) Prior Publication Data

US 2019/0042381 A1 Feb. 7, 2019

(30) Foreign Application Priority Data

Aug. 3, 2017 (IN) .............................. 201741027612

(51) Int. Cl.
*G06F 11/27* (2006.01)
*G06F 11/277* (2006.01)
*G06F 11/22* (2006.01)
*G06F 11/10* (2006.01)

(52) U.S. Cl.
CPC .......... *G06F 11/27* (2013.01); *G06F 11/1004* (2013.01); *G06F 11/2236* (2013.01); *G06F 11/277* (2013.01)

(58) Field of Classification Search
CPC ...... G06F 11/07; G06F 11/0772; G06F 11/20; G06F 11/0751; G06F 11/30; G06F 11/3177; G06F 11/31723; G06F 11/2236
See application file for complete search history.

(56) References Cited

U.S. PATENT DOCUMENTS

| | | | | |
|---|---|---|---|---|
| 7,082,552 B2* | 7/2006 | Musoll | .................... | G06F 9/546 370/473 |
| 7,647,539 B2* | 1/2010 | Bussa | .................. | G06F 11/261 714/11 |
| 7,747,908 B2* | 6/2010 | Choudhury | ........... | G06F 11/263 714/32 |
| 8,572,449 B1* | 10/2013 | Ardhanari | ............... | G06F 11/27 714/30 |
| 2003/0208710 A1* | 11/2003 | Martin-de-Nicolas | ...................... | G06F 11/263 714/736 |
| 2008/0065943 A1* | 3/2008 | Botha | ................... | H04L 1/1829 714/748 |
| 2009/0024877 A1* | 1/2009 | Choudhury | ........... | G06F 11/263 714/43 |

(Continued)

*Primary Examiner* — Nadeem Iqbal

(74) *Attorney, Agent, or Firm* — Ebby Abraham; Charles A. Brill; Frank D. Cimino

(57) ABSTRACT

A processor includes a central processing unit (CPU) and diagnostic monitoring circuitry. The diagnostic monitoring circuitry is coupled to the CPU. The diagnostic monitoring circuitry includes a monitoring and cyclic redundancy check (CRC) computation unit. The monitoring and CRC computation unit is configured to detect execution of a diagnostic program by the CPU, and to compute a plurality of CRC values. Each of CRC values corresponds to processor values retrieved from a given register of the CPU or from a bus coupling the CPU to a memory and peripheral subsystem while the CPU executes the diagnostic program.

13 Claims, 3 Drawing Sheets

(56) References Cited

U.S. PATENT DOCUMENTS

| | | | | |
|---|---|---|---|---|
| 2011/0131452 A1* | 6/2011 | Kumar | ................ | G06F 11/2242 |
| | | | | 714/34 |
| 2013/0238947 A1* | 9/2013 | Ichioka | ................ | G11C 29/56 |
| | | | | 714/718 |
| 2014/0184616 A1* | 7/2014 | Gupta | ................ | G06F 11/006 |
| | | | | 345/505 |
| 2017/0315865 A1* | 11/2017 | Fisher | ................ | G06F 16/215 |

* cited by examiner

US 10,817,395 B2

PROCESSOR WITH NON-INTRUSIVE SELF-TESTING

RELATED APPLICATIONS

This application claims priority to India Provisional Application No. 201741027612, filed Aug. 3, 2017, which is hereby incorporated by reference.

BACKGROUND

Microprocessors, microcontrollers, and similar electronic devices, are used in a variety of applications. Various conditions and events can cause failures in such devices that adversely affect device operation. The consequences of such failures are typically of much greater concern when the devices in which the failures occur are performing mission critical processes or processes that affect user safety. To ensure proper operation in such applications, the operational condition of the devices is continuously evaluated. The devices may include self-test features that support the continuous evaluation of operation.

SUMMARY

Apparatus and methods for monitoring processor operation are disclosed herein. In one example, a processor includes a central processing unit (CPU) and diagnostic monitoring circuitry. The diagnostic monitoring circuitry is coupled to the CPU. The diagnostic monitoring circuitry includes a monitoring and cyclic redundancy check (CRC) computation unit. The monitoring and CRC computation unit is configured to detect execution of a diagnostic program by the CPU, and to compute a plurality of CRC values. Each of CRC values corresponds to processor values retrieved from a given register of the CPU or from a bus coupling the CPU to a memory and peripheral subsystem while the CPU executes the diagnostic program. Each of the CRC values corresponds to various aspects of the CPU, such as registers, memory buses, or internal states during execution of the diagnostic program.

In another example, processor diagnostic circuitry includes diagnostic monitoring circuitry. The diagnostic monitoring circuitry includes a monitoring and cyclic redundancy check (CRC) computation unit. The monitoring and CRC computation unit is configured to detect execution of a diagnostic program by a central processing unit (CPU), and to compute a plurality of CRC values. Each of the CRC values corresponds to processor values retrieved from a given register of the CPU or from a bus coupling the CPU to a memory and peripheral subsystem while the CPU executes the diagnostic program. Each of the CRC values corresponds to various aspects of the CPU, such as registers, memory buses, or internal states during execution of the diagnostic program.

In a further example, a method for monitoring processor health includes executing, by a processor, instructions of a diagnostic program during discontinuous processor idle intervals. The method also includes detecting, by diagnostic monitoring circuitry, execution of the diagnostic program in the discontinuous idle intervals. The method further includes computing a plurality of cyclic redundancy check (CRC) values, each of CRC values corresponding to processor values retrieved from a given register of a central processing unit (CPU) of the processor while the CPU executes the diagnostic program.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Periodic self-testing is important, or required, in a number of applications (e.g., some embedded real-time applications, mission critical applications, etc.). However, conventional techniques for self-testing may be intrusive or inefficient. For example, hardware built-in self-test (BIST) is intrusive because the central processing unit (CPU) being tested in not available to execute a user application while the hardware BIST is being performed. Alternatively, purely software based self-testing is inefficient because a large number of instructions must be executed to provide adequate fault coverage.

Example processors of the present disclosure include self-testing that is non-intrusive and efficient. Self-testing may be fully interruptible to provide the fast response times required in embedded real-time systems. In some examples, self-test programming may execute only during CPU idle time, so application program timing is generally unaffected by self-testing. The disclosed processors may include circuitry that retrieves register and state values from the CPU, processor busses, peripheral devices, etc. During execution of the self-test program, each given type of retrieved value is input to cyclic redundancy check (CRC) circuitry that computes a CRC value for the given type of retrieved value over the length of the self-test. On completion of self-test program execution, the CRC values are compared to predetermined correct CRC values stored with the self-test program to determine whether the CPU and associated systems are operating properly.

Figure 1:
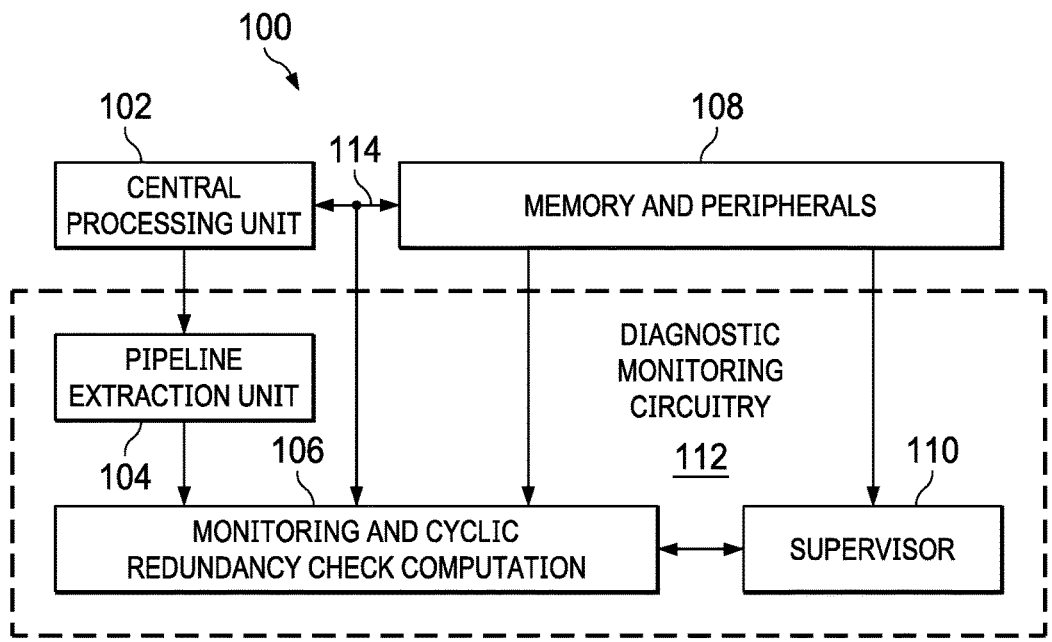
FIG. 1 shows a block diagram of a processor that includes non-intrusive self-testing in accordance with various examples.

FIG. 1 shows a block diagram of a processor 100 that includes non-intrusive self-testing in accordance with various examples. The processor 100 may be a general-purpose microprocessor, a microcontroller, a digital signal processor, or other instruction execution device. The processor 100 includes a central processing unit (CPU) 102, a memory and peripheral subsystem 108, and diagnostic monitoring circuitry 112. The CPU 102 includes circuitry that executes instructions retrieved from memory. For example, the CPU 102 may include an execution pipeline including a fetch unit, a decode unit, and an execution unit. Some examples of the CPU 102 may include additional functional units, such as data and/or instruction caches, branch prediction circuitry, etc. The fetch unit retrieves instructions from instruction memory, for execution by the processor 100. The instruction memory may be included in the processor 100, or external to the processor 100. The fetch unit provides the retrieved instructions to the decode unit.

The decode unit examines the instructions received from the fetch unit, and translates each instruction into controls suitable for operating the execution unit, processor registers, and other components of the processor to perform operations that effectuate the instructions. The decode unit provides control signals to the execution unit, and other units of the processor 100, that cause the processor 100 to carry out the operations needed to execute each instruction.

The execution unit includes arithmetic circuitry, shifters, multipliers, registers, logical operation circuitry, etc. that are arranged to manipulate data values as specified by the control signals generated by the decode unit. Some implementations of the processor 100 may include multiple execution units that include the same or different data manipulation capabilities.

The memory and peripheral subsystem 108 includes various circuits that operate in conjunction with the CPU 102. For example, the memory and peripheral subsystem 108 may include memories for storing program and data, communication circuits, interrupt control circuits, timer circuits, direct memory access control circuits, and/or various other circuits that provide services to the CPU 102. The memory and peripheral subsystem 108 is communicatively coupled to the CPU 102 via one or more buses 114.

The diagnostic monitoring circuitry 112 monitors the operation of the CPU 102 and/or the memory and peripheral subsystem 108 to determine whether the processor 100 is operating properly. The diagnostic monitoring circuitry 112 is coupled to the CPU 102, the memory and peripheral subsystem 108, and/or the one or more busses 114 for transfer of information regarding the operational state of the CPU 102 and/or the memory and peripheral subsystem 108 to the diagnostic monitoring circuitry 112. The diagnostic monitoring circuitry 112 includes a pipeline extraction unit 104, a monitoring and CRC computation unit 106, and a supervisor circuitry 110.

The pipeline extraction unit 104 is coupled to the CPU 102. The pipeline extraction unit 104 retrieves information from the CPU 102 that would not otherwise be available to circuitry external to the CPU 102. For example, the pipeline extraction unit 104 may retrieve from the CPU 102 instruction register contents, pipeline state information, program counter values, and/or other information generated internal to the CPU 102. The pipeline extraction unit 104 may combine some information retrieved from the CPU 102 so that the amount of information provided to the monitoring and CRC computation unit 106 can be reduced. For example, the pipeline extraction unit 104 may simultaneously retrieve multiple different values from the CPU 102 and combine multiple values using an exclusive-OR function. The exclusive-OR of the multiple values may be provided to the monitoring and CRC computation unit 106.

The monitoring and CRC computation unit 106 is coupled to the pipeline extraction unit 104, the memory and peripheral subsystem 108, and the one or more buses 114. The monitoring and CRC computation unit 106 captures information provided by the pipeline extraction unit 104, the memory and peripheral subsystem 108, and the one or more buses 114 and computes a CRC value for each different type of information captured over the execution of a self-test program (also referred to herein as a diagnostic program) by the processor 100. For example, the monitoring and CRC computation unit 106 may compute a first CRC value using program counter values retrieved during execution of the self-test program, compute a second CRC value using instruction register values retrieved during execution of the self-test program, etc.

The monitoring and CRC computation unit 106 analyzes the information received from the pipeline extraction unit 104, the memory and peripheral subsystem 108, and the one or more buses 114 to determine whether a CRC value is to be updated using the received information. Because the CRC values are updated based on execution of the self-test program, some implementations of the monitoring and CRC computation unit 106 examine program counter values to determine whether the self-test program is executing. For example, a range of address values at which the self-test program is stored may be pre-programmed into the monitoring and CRC computation unit 106. If the program counter address value falls within the range of address values, then the monitoring and CRC computation unit 106 may update CRC values using the information retrieved from the pipeline extraction unit 104, the memory and peripheral subsystem 108, and the one or more buses 114.

When execution of the self-test program is complete, the CRC values computed by the monitoring and CRC computation unit 106 may be compared to predetermined correct CRC values to determine whether the processor 100 passed or failed the self-test. For example, the predetermined expected CRC values may be stored as part of the self-test program and comparison of the computed CRC values to the predetermined correct CRC values may be performed by the CPU 102 as part of self-test program execution or performed by the monitoring and CRC computation unit 106. Results of the self-test may be stored for further processing and/or provided to a user.

The supervisor circuitry 110 monitors self-testing to ensure that execution of the self-test program is in accordance with established specifications. For example, if an established specification provides that the self-test program should execute for at least a first amount of time in a predetermined time interval, then the supervisor circuitry 110 may measure execution time of the self-test in the predetermined time interval and adjust operating parameters of the processor 100 to change the execution time of the self-program based on the measured execution time. Adjustments may include enforcing a minimum execution time for the self-test program in preemption of user programs.

Figure 2:
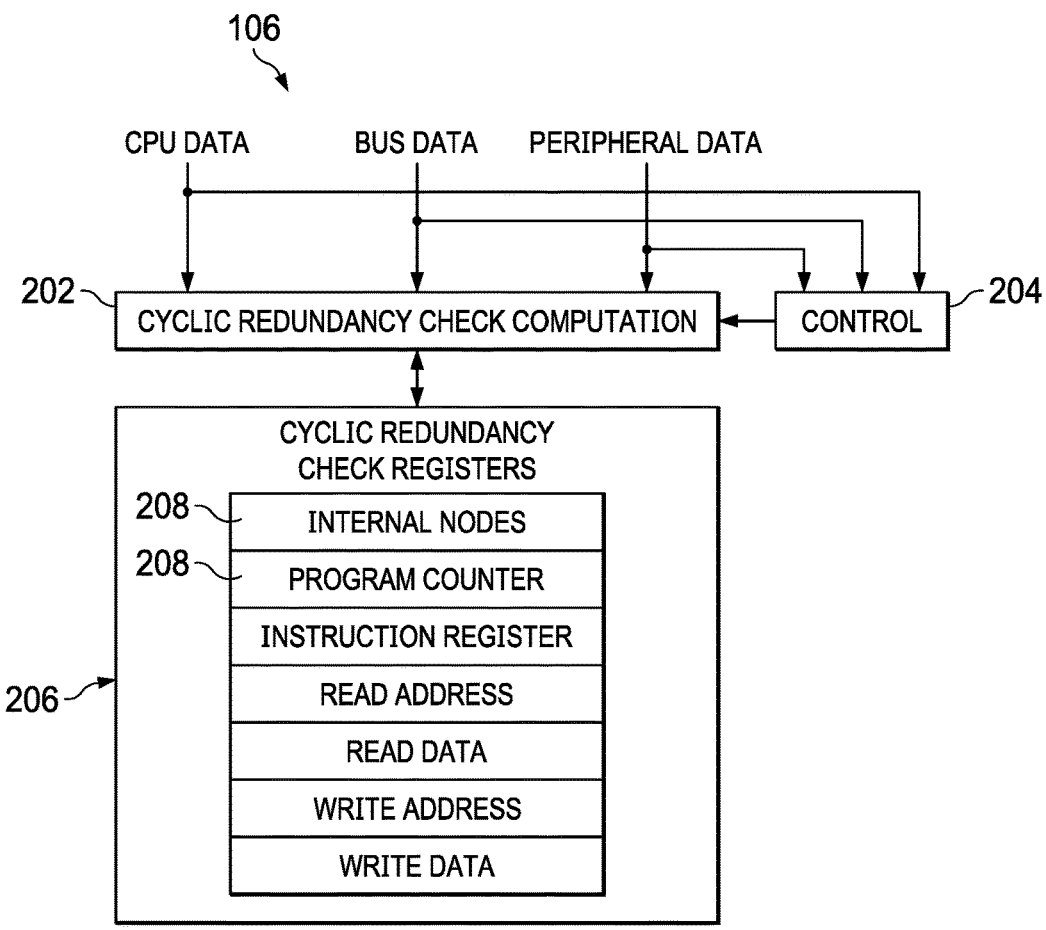
FIG. 2 shows a block diagram of a monitoring and cyclic redundancy check computation unit for non-intrusive self-testing in accordance with various examples.

FIG. 2 shows a block diagram of the monitoring and CRC computation unit 106 in accordance with various examples. The monitoring and CRC computation unit 106 includes CRC computation circuitry 202, CRC control circuitry 204, and CRC registers 206. The CRC registers 206 include a register 208 for each of a plurality of CRC values computed by the monitoring and CRC computation unit 106. For example, the CRC registers 206 may include a register 208 for storage of each of a write data CRC value, a write address CRC value, a read data CRC value, a read address CRC value, an instruction register CRC value, a program counter CRC value, and an internal nodes CRC value. The number of bits provided in each CRC register 208 may vary in different implementations. In some implementations, a CRC register 208 may store a 32-bit CRC value.

The CRC computation circuitry 202 is coupled to the CRC registers 206, the pipeline extraction unit 104, the memory and peripheral subsystem 108, and/or the buses 114. The CRC computation circuitry 202 includes circuitry that evaluates a CRC polynomial with respect to the current value of a CRC register 208 and a new information value received from the pipeline extraction unit 104, the memory and peripheral subsystem 108, and/or the buses 114. Thus, the CRC computation circuitry 202 retrieves a value from the CRC registers 206, computes a CRC value based on the value retrieved from the CRC registers and a new information value, and stores the result of polynomial evaluation in the CRC registers 206. Some implementations of the CRC computation circuitry 202 may include separate CRC evaluation circuits for each CRC register 208.

The CRC control circuitry 204 examines the information received from the pipeline extraction unit 104, the memory and peripheral subsystem 108, and/or the buses 114 to determine whether the self-test is executing and the CRC values stored in the CRC registers 206 should be updated based on the information received from the pipeline extraction unit 104, the memory and peripheral subsystem 108, and/or the buses 114. For example, the CRC control circuitry 204 may store information defining a range of address values at which the self-test program is stored. If a program counter address value received from the pipeline extraction unit 104 falls within the range, then the CRC control circuitry 204 may determine that the self-test is executing, and in-turn may select a CRC register 208 corresponding to received information to be updated and enable the CRC computation circuitry 202 to update the CRC value stored in the selected CRC register 208.

Figure 3:
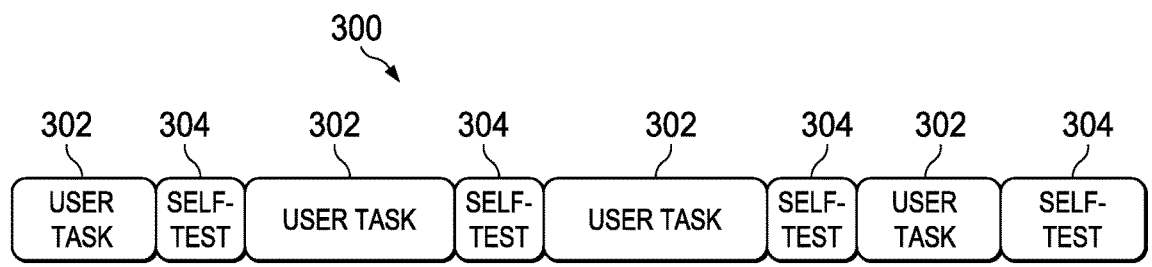
FIG. 3 shows an example of a self-test execution time sequence in a processor that includes non-intrusive self-testing in accordance with various examples.

FIG. 3 shows self-test execution in the processor 100 in accordance with various examples. In implementations of the processor 100, execution of the self-test program is interleaved with execution of user programs. In FIG. 3, execution of the self-test 304 is interleaved with execution of a user task 302. For example, the processor 100 may execute the self-test 304 only when no user task 302 is ready to execute. That is, the processor 100 may execute the self-test 304 only when the CPU 102 would be idle otherwise (i.e., CPU idle time). Thus, execution of the self-test 304 does not interfere with the timing of execution of the user task 302. Because execution of the self-test 304, from start to end, is performed over any number of discontinuous execution intervals, the monitoring and CRC computation unit 106 identifies execution of the self-test program. The monitoring and CRC computation unit 106 enables updating of the CRC registers 206 over the entire discontinuous execution of the self-test program, and disables updating of the CRC registers 206 if a user task 302 is executing.

Figure 4:
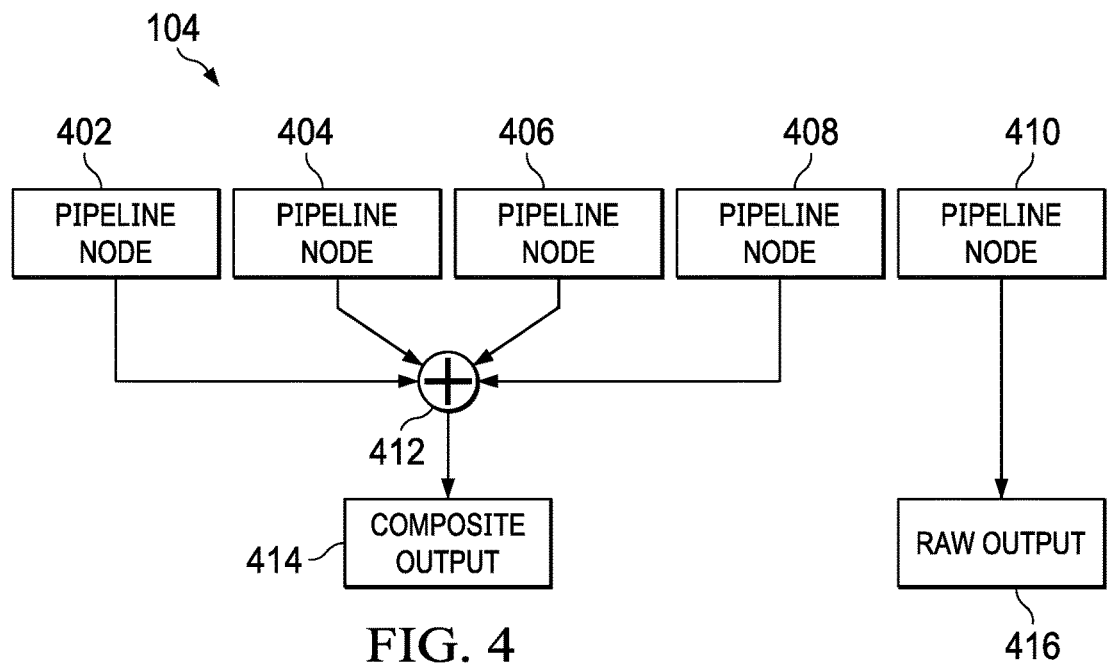
FIG. 4 shows a block diagram of a pipeline extraction unit for non-intrusive self-testing in accordance with various examples.

FIG. 4 shows a block diagram of the pipeline extraction unit 104 in accordance with various examples. As shown in FIG. 1, the pipeline extraction unit 104 interfaces with the CPU 102. In FIG. 4, the pipeline nodes 402, 404, 406, 408, and 410 may be outputs of registers or other circuits in the CPU 102. The pipeline extraction unit 104 passes some information retrieved from a pipeline node through to the monitoring and CRC computation unit 106 without modification. Thus, the pipeline extraction unit 104 provides the monitoring and CRC computation unit 106 with direct access to information generated in the CPU 102. In FIG. 4, information retrieved from the pipeline node 410 is passed without modification to the monitoring and CRC computation unit 106 as raw output 416. Implementations of the pipeline extraction unit 104 may pass, without modification, information retrieved from any number of pipeline nodes of the CPU 102.

The pipeline extraction unit 104 may also include circuitry to process or combine information retrieved from some pipeline nodes of the CPU 102. By combining information retrieved from multiple pipeline nodes of the CPU 102, the pipeline extraction unit 104 reduces the number of different data values provided to the monitoring and CRC computation unit 106, which in turn reduces the number of CRC values maintained by the monitoring and CRC computation unit 106. In the example of FIG. 4, the pipeline extraction unit 104 includes exclusive-OR circuitry 412. Information retrieved from pipeline nodes 402, 404, 406, and 408 is combined by the exclusive-OR circuitry 412 to produce a composite output 414 that is provided to the monitoring and CRC computation unit 106. Implementations of the pipeline extraction unit 104 may combine information retrieved from any number of pipeline nodes of the CPU 102 to produce a composite output, and implementations may produce any number of different composite outputs that combine different pipeline nodes of the CPU 102.

Figure 5:
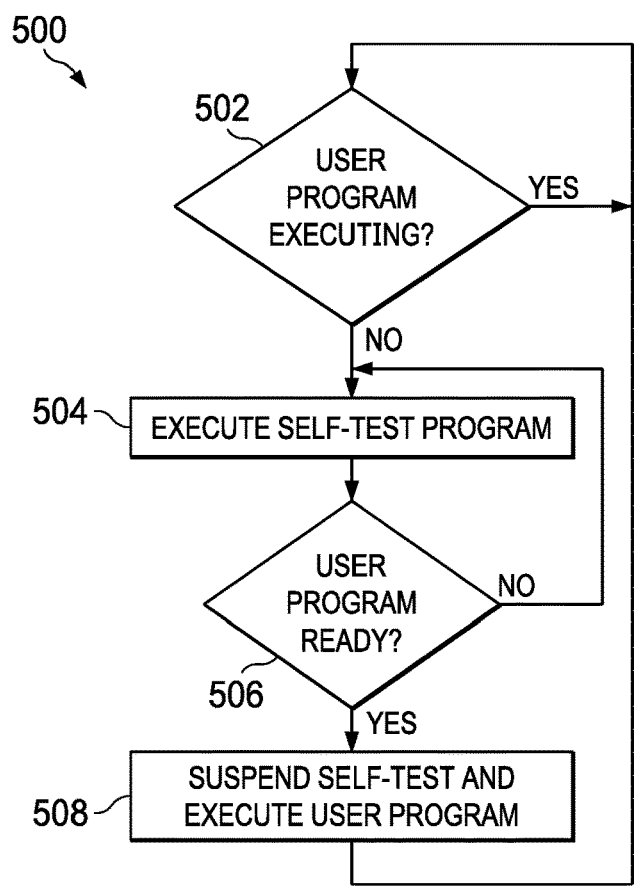
FIG. 5 shows a flow diagram for a method for executing a non-intrusive self-test in accordance with various examples.

FIG. 5 shows a flow diagram for a method for executing a non-intrusive self-test in accordance with various examples. Though depicted sequentially as a matter of convenience, at least some of the actions shown can be performed in a different order and/or performed in parallel. Additionally, some implementations may perform only some of the actions shown. At least some of the operations of the method 500 can be implemented by the processor 100.

In block 502, the processor 100 is executing instructions retrieved from program storage (i.e., instructions retrieved from memory). The monitoring and CRC computation unit 106 is receiving information from the pipeline extraction unit, the memory and peripheral subsystem 108, and/or the buses 114. If the instructions being executed are part of a user program (i.e., user task 302), then monitoring of program execution continues in block 502.

On the other hand, if no user program is being executed in block 502 (i.e., no user program is ready for execution), then in block 504, the processor 100 starts or resumes execution of instructions of a self-test program (i.e., self-test 304).

In block 506, the processor 100 is executing the self-test program started in block 504. The processor 100 determines whether a user program is ready to be executed. If no user program is ready to be executed, then the processor 100 continues to execute the self-test program.

If a user program is ready to be executed in block 506, then in block 508, the processor 100 suspends execution of the self-test program and starts/resumes execution of the user program.

Thus, the processor 100 executes the self-test program only if no user program is executing or ready to be executed. In this way, implementations of the processor 100 provide self-testing that is non-intrusive respect to the timing or functionality of user programs.

Figure 6:
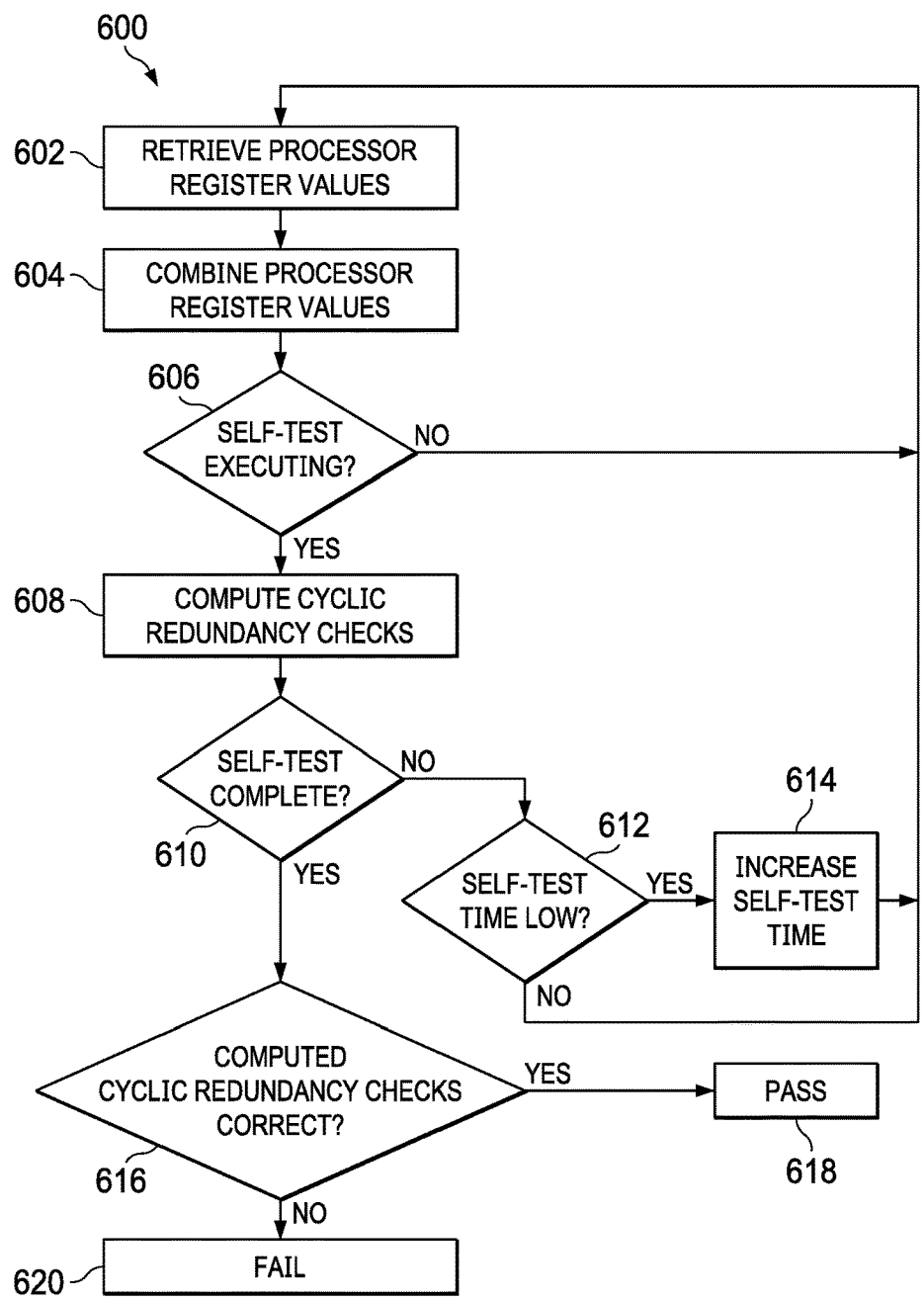
FIG. 6 shows a flow diagram for a method for non-intrusive self-testing in accordance with various examples.

FIG. 6 shows a flow diagram for a method for non-intrusive self-testing in accordance with various examples. Though depicted sequentially as a matter of convenience, at least some of the actions shown can be performed in a different order and/or performed in parallel. Additionally, some implementations may perform only some of the actions shown. At least some of the operations of the method 600 can be implemented by the processor 100.

In block 602, the processor 100 is executing instructions retrieved from program storage (i.e., instructions retrieved from memory). The pipeline extraction unit 104 retrieves various information values from the CPU 102. The information values may include a program counter value, an instruction value, a read address value, a read data value, a write address value, and/or a write data value, and/or various state/data values provided in registers of the CPU 102 and/or present at pipeline nodes of the CPU 102.

In block 604, the pipeline extraction unit 104 combines some of the information values retrieved from the CPU 102 to reduce the number of values provided to the monitoring and CRC computation unit 106. Some implementations of the pipeline extraction unit 104 may apply an exclusive-OR function to produce a value that is a composite of multiple values retrieved from the CPU 102.

In block 606, the monitoring and CRC computation unit 106 evaluates the information received from the pipeline execution unit 104, the memory and peripheral subsystem 108, and/or the buses 114 to determine whether the CPU 102 is currently executing a self-test (i.e., self-test 304). For example, the monitoring and CRC computation unit 106 may compare the address of an executing instruction received via the pipeline extraction unit 104 to the address range at which the self-test program is stored to determine whether the self-test is executing. If the self-test is not executing, then the method continues in block 602 with retrieval of additional information from the CPU 102.

If, in block 606, the monitoring and CRC computation unit 106 determines that the self-test is executing, then in block 608, the monitoring and CRC computation unit 106 computes a CRC value for each of a plurality of information values received from the pipeline extraction unit 104, the memory and peripheral subsystem 108, and/or the buses 114. Computing the CRC value may include retrieving a current CRC value from storage (e.g., a register 208) and applying the current CRC value and a new information value received from the pipeline extraction unit 104, the memory and peripheral subsystem 108, and/or the buses 114 to a predetermined polynomial.

In block 610, the processor 100 determines whether self-test execution is complete. For example, execution of the self-test may include setting a state value that designates self-test completion. In various implementations, the determination of self-test completion may be made by the supervisor circuitry 110, the CPU 102, the monitoring and CRC computation unit 106, or other component of the processor 100. If the self-test is complete, then in block 616, the processor 100 determines whether the self-test failed or passed. The processor 100 may compare the CRC values computed by the monitoring and CRC computation unit 106 during self-test execution to predetermined correct CRC values. For example, for each CRC value computed by the monitoring and CRC computation unit 106 a predetermined correct CRC value may be stored in memory (e.g., as part of the self-test program). If the CRC values computed by the monitoring and CRC computation unit 106 during self-test execution are equal to the predetermined correct CRC values, then the processor 100 is deemed to pass the self-test in block 618. On the other hand, if the CRC values computed by the monitoring and CRC computation unit 106 during self-test execution are not equal to the predetermined correct CRC values, then the processor 100 is deemed to fail the self-test in block 620.

If, in block 610, the processor 100 determines that execution of the self-test is not complete, then in block 612, the supervisor circuitry 110 determines whether a minimum amount of time has been devoted to execution of the self-test. The minimum amount of time may be at least a predetermined test execution time within a given time interval (e.g., 10 milliseconds per second). If the time devoted to execution of the self-test is low (e.g., execution time of user tasks allows too little time for self-test execution), then in block 614, the supervisor circuitry 110 adjusts operation of the processor 100 to ensure that the self-test executes for at least the minimum execution time. For example, the supervisor circuitry 110 may disable preemption of the self-test by user tasks for at least a time selected to provide the self-test with the required minimum execution time.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   a central processing unit (CPU) comprising a first register and a second register; and
   monitoring circuitry coupled to the CPU, the monitoring circuitry configured to:
   detect execution of a diagnostic program by the CPU;
   retrieve a first processor value from the first register of the CPU;
   retrieve a second processor value from the second register of the CPU;
   combine the first processor value and second processor value; and
   compute a cyclic redundancy check (CRC) value based on the combined first and second processor value.

2. The processor of claim 1, wherein the CPU is configured to execute the diagnostic program only during CPU idle time.

3. The processor claim 1, wherein
   combining the first processor value and second processor value results in a single value; and
   the CRC value is based on the single value.

4. The processor of claim 1, wherein combining the first processor value and the second processor value into the single value comprises applying an exclusive OR function to the first processor value and the second processor value.

5. The processor of claim 1, wherein the processor value comprises:
   a program counter value;
   an instruction value;
   a read address value;
   a read data value;
   a write address value; and
   a write data value.

6. The processor claim 1, wherein the monitoring and CRC computation unit is configured to:
   identify completion of execution of the diagnostic program; and
   responsive to the completion, compare the CRC value to a predetermined CRC value.

7. The processor claim 1, wherein the monitoring circuitry further configured to:
   monitor execution of the diagnostic program; and
   increase time allocated to execution of the diagnostic program based on a time during which the diagnostic program executes within a predetermined interval being less than a minimum predetermined diagnostic execution time.

8. The processor of claim 1, wherein the monitoring circuitry is configured to compute the CRC value over a discontinuous execution interval of the diagnostic program.

9. A method for monitoring processor operation, comprising:
   detecting, by monitoring circuitry, execution of the diagnostic program by a central processing unit (CPU);
   retrieving a first processor value from a first register of the CPU;
   retrieving a second processor value from a second register of the CPU;
   combining the first processor value and the second processor value; and
   computing a cyclic redundancy check (CRC) value based on the combined first and second processor value.

10. The method of claim 9, wherein
    combining the first processor value and the second processor value results in a single value; and
    the CRC value is based on the single value.

11. The method of claim 9, wherein combining the first processor value and the second processor value into the single value comprises applying an exclusive OR function to the first processor value and the second processor value.

12. The method of claim 10, further comprising:
    identifying completion of execution of the diagnostic program; and
    responsive to the completion, comparing the CRC value to a predetermined CRC value.

13. The method of claim 10, further comprising:
    monitoring execution of the diagnostic program; and
    increasing time allocated to execution of the diagnostic program based on a time during which the diagnostic program executes within a predetermined interval being less than a minimum predetermined diagnostic execution time.

* * * * *